3,654,347
ETHYLENICALLY UNSATURATED, HYDROXY-CONTAINING LACTONE PRODUCTS

Harrison S. Kincaid, Moorestown, and Fritz Hostettler, Verona, N.J., and Harry Vineyard, South Charleston, W. Va., assignors to Union Carbide Corporation
No Drawing. Filed May 3, 1968, Ser. No. 726,578
Int. Cl. C07c 69/66
U.S. Cl. 260—484 R     10 Claims

ABSTRACT OF THE DISCLOSURE

Monohydroxyl- and dihydroxyl-containing polylactones possessing at least one pendant polymerizable ethylenic group are prepared by reacting a lactone having from 4 to 6 carbon atoms in the ring, with an organic ethylenically unsaturated, hydroxy-containing initiator such as allyl alcohol, 1,1,1-trimethylolpropane monoallyl ether, etc. The resulting unsaturated polylactones are useful in preparing siloxane surfactants, unsaturated polyurethane gum stocks which can be cured to highly useful vulcanizates, etc.

---

This invention relates to unsaturated hydroxyl polymers of lactone compounds. In one aspect the invention relates to isocyanate-terminated prepolymers derived from unsaturated polymers of lactone compounds. In another aspect the invention relates to polyurethane elastomers which contain polymerizable ethylenic groups. In a further aspect, the invention relates to the vulcanizates which are obtained by crosslinking the aforesaid polyurethane elastomers by methods employed, for example, in the natural and synthetic rubber arts.

One aspect of the invention is directed to the preparation of unsaturated hydroxyl polymers of lactone compounds, hereinafter termed "unsaturated polylactones" for convenience and brevity. These unsaturated polylactones are formed by reacting, at an elevated temperature, for example, at a temperature of from about 50° C. to about 250° C., an admixture containing a lactone and an organic initiator or starter; said lactone having from six to eight carbon atoms in the lactone ring and at least one hydrogen substituent on the carbon atom which is attached to the oxy group in said ring; said organic initiator having at least one reactive hydrogen substituent which is preferably in the form of hydroxyl; and at least one polymerizable pendant ethylenic group, i.e., >C=C<, said reactive hydrogen substituent being capable of opening the lactone ring whereby said lactone is added to said initiator as a substantially linear group thereto. The unsaturated polylactone products possess, on the average, at least one such linear group per reactive hydrogen substituent, each linear group having a terminal oxy group at one end, a carbonyl group at the other end, and an intermediate chain of from five to seven carbon atoms which has at least one hydrogen substituent on the carbon atom in said intermediate chain that is attached to said terminal oxy group. The unsaturated polylactones are further characterized in that they contain at least one hydroxyl group, preferably two hydroxyl groups, as well as the polymerizable pendant ethylenic group(s) of the organic initiator which serves as the seed to which are attached the linear lactone units.

The preparation of the aforesaid hydroxyl-containing unsaturated polylactones can be effected in the absence or presence of a catalyst to give polylactones of widely varying and readily controllable molecular weights without forming water of condensation. As such, the polymerization processes of the invention are desirably suited for the preparation of "tailormade" unsaturated polylactones to fit a wide variety of uses and applications. Admirably suitable unsaturated polylactones are characterized by the presence of recurring linear lactone units, that is, carbonylalkyleneoxy

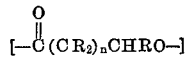

wherein $n$ is from 4 to 6, and wherein the R variables having the values set out in the next paragraph.

The lactone used in the preparation of the unsaturated polylactones may be any lactone, or combination of lactones, having at least six carbon atoms, for example, from six to eight carbon atoms, in the ring and at least one hydrogen substituent on the carbon atom which is attached to the oxy group in said ring. In one embodiment, the lactone used as starting material can be represented by the general formula:

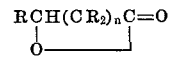

in which $n$ is at least four, for example, from four to six, at least $n+2$ R's are hydrogen, and the remaining R's are substituents selected from the group consisting of hydrogen, alkyl, and alkoxy radicals. Lactones having greater number of substituents other than hydrogen on the ring, and lactones having four or less carbon atoms in the ring, are considered unsuitable because of the tendency that polymers thereof have to revert to the monomer, particularly at elevated temperatures.

The lactones which are preferred in the preparation of the hydroxyl-containing unsaturated polylactones are the epsilon-caprolactones having the general formula:

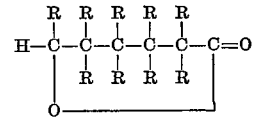

wherein at least six of the R variables are hydrogen and the remainder are hydrogen, alkyl, or alkoxy, none of the substituents contain more than about twelve carbon atoms, and the total number of carbon atoms in the substituents on the lactone ring does not exceed about twelve.

Among the substituted epsilon-caprolactones considered most suitable are the various monoalkyl epsilon-caprolactones such as the monomethyl-, monoethyl-, monopropyl-, monoisopropyl- etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; and alkoxy epsilon-caprolactones such as methoxy and ethoxy epsilon-caprolactones.

Lactones having more than six carbon atoms in the ring, e.g., zeta-enantholactone and eta-caprylolactone including those which have lower alkyl or lower alkoxy substituents thereon, can also be employed as starting material.

The organic initiators which are contemplated in the preparation of the novel polylactones are characterized in that they (a) contain at least one, preferably only one pendant polymerizable ethylenic group, i.e., >C=C<, (b) contain at least one reactive hydrogen substituent, preferably from one to two reactive hydrogen substituents, preferably still from one to two hydroxyl groups, (c) are free from acetylenic and benzenoid unsaturation, and (d) are composed of (i) carbon, hydrogen, and oxygen atoms, or (ii) carbon, hydrogen, oxygen, and amino nitrogen atoms. The initiators which are preferred are composed of carbon, hydrogen, and oxygen atoms, the oxygen atoms being in the form of aliphatic etheric oxygen (—O—) and/or hydroxyl.

Illustrative subclasses of organic initiators include the following:

(a) The 1,1,1-trimethylolalkane monoalkenyl ethers

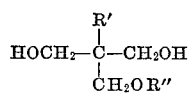

wherein R' is hydrogen or alkyl preferably of from 1 to 20 carbon atoms, and wherein R'' is alkenyl preferably of from 2 to 20 carbon atoms;

(b) The alkenyl-substituted alkanediols

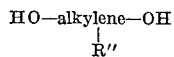

wherein R'' is alkenyl preferably of from 2 to 20 carbon atoms, and wherein the alkylene moiety contains at least 2 carbon atoms, preferably from 2 to 20 carbon atoms;

(c) The N,N-bis(α-hydroxyalkyl)alkenylamines

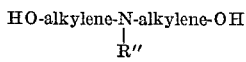

wherein R'' is alkenyl preferably of from 2 to 20 carbon atoms, and wherein the alkylene moiety contains at least 2 carbon atoms, preferably from 2 to 20 carbon atoms;

(d) The alkenols of the formula

R''OH wherein R'' is alkenyl preferably of from 2 to 20 carbons, and preferably still R'' is a terminal alkenyl radical;

(e) The 1,1 - bis(alkenyloxymethyl)-1,1-dimethylolmethanes

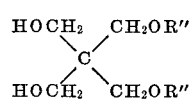

wherein both R'''s are alkenyl preferably of from 2 to 20 carbon carbon atoms;

(f) The 1,1 - bis(alkenoyloxymethyl)-1,1-dimethylolmethanes

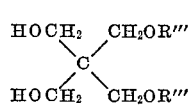

wherein both R''''s are alkenoyl preferably of from 2 to 20 carbon atoms;

(g) 1 - alkenyl - 1 - alkenyloxymethyl-1,1-dimethylolmethanes

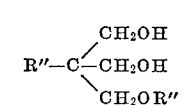

wherein both R'''s are alkenyl preferably of from 2 to 20 carbon atoms.

Specific initiators include, among others,

N,N-bis(2-hydroxyethyl) allylamine,
N,N-bis(2-hydroxy-1-methylethyl) allylamine,
N,N-bis(2-hydroxyethyl)-3-butenylamine,
1,1-bis(allyloxymethyl)-1,1-dimethylolmethane,
1,1-bis(5-hexenyloxymethyl)-1,1-dimethylolmethane,
1,1-diallyl-1,1-dimethylolmethane,
4-methyl-3-cyclohexene-1,1-dimethanol,
3-cyclohexene-1,1-dimethanol,
3-allyloxy-1,5-pentanediol,
3-allyloxy-1,2-propanediol,
2-(allyloxymethyl)-2-methyl-1,3-propanediol,
2-vinyl-1,3-propanediol, and
2-(allyloxyethyl)-1,3-propanediol. Those initiators which contain a terminal aliphatic ethylenic bond, i.e.,

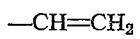

—CH=CH₂ are preferred.

The preparation of the unsaturated initiators are well documented in the art. For example, the 1-alkenyl-1-alkyl-1,1-dimethylolmethanes can be prepared by reacting at least 3 moles of formaldehyde with 1 mol of an alkenal having the formula

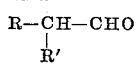

wherein R is alkenyl and R' is alkyl. The 1,1-bis(alkenyloxymethyl) 1,1-dimethylolmethanes are obtained by reacting one mole of pentaerythritol with two moles of alkenyl chloride under heat. The use of an alkenoyl chloride in lieu of alkenyl chloride would give 1,1-bis(alkenoyloxymethyl)-1,1-dimethylolmethane. The unsubstituted- and 1-alkyl substituted 1,1,1-trimethylolalkane monoalkenyl ethers easily result from the reaction of a saturated aldehyde (RCH₂CHO wherein R represents hydrogen or alkyl) with at least 3 moles of formaldehyde to give 1,1,1-trimethylolalkane. This product then, in turn, can be reacted with an alkenyl chloride (equimolar quantities) to yield 1,1,1-trimethylolalkane monoalkenyl ether. The use of alkenoyl chloride instead of alkenyl chloride would result in the corresponding trihydroxy ester.

The preparation of the unsaturated polylactones can be carried out in the absence of a catalyst though it is preferred to effect the reaction in the presence of a catalyst. Preferred catalysts include, by way of examples, the stannous diacylates and stannic tetraacylates such as stannous dioctanoate and stannic tetraoctanoate.

The catalysts are employed in a catalytically significant concentration. In general, a catalyst concentration in the range of from about 0.0001 and lower, to about 3, and higher, weight percent, based on the weight of total monomeric feed, is suitable. The lactone polymerization reaction is conducted at an elevated temperature. In general, a temperature in the range of from about 50° C., and lower, to about 250° C. is suitable; a range from about 100° C. to about 200° C. is preferred. The reaction time can vary from several minutes to several days depending upon the correlation of variable such as temperature, choice of reactants, etc.

The polymerization reaction preferably is initiated in the liquid phase. It is desirable to effect the polymerization reaction under an inert atmosphere, e.g., nitrogen.

The preparation of the unsaturated polylactones via the preceding illustrative methods has the advantage of permitting accurate control over the average molecular weight of the unsaturated polylactone products and further of promoting the formations of substantially homogeneous products in which the molecular weights of the individual molecules are reasonably close to the average molecular weight. This control is accomplished by preselecting the molar proportions of lactone and initiator in a manner that will readily be appreciated by those skilled in the art. Thus, for example, if it is desired to form an unsaturated polylactone in which the average molecular weight is approximately ten times the molecular weight of the initial lactone, the molar proportions of lactone and initiator utilized in the polymerization reaction are fixed at approximately 10:1 inasmuch as it is to be expected that on the average there will be added to each molecule of initiator approximately ten lactone molecules.

The unsaturated initiator opens the lactone ring to produce a product which has one or more terminal groups that are capable of opening further lactone rings and thereby adding more and more lactone units to the growing molecule. Thus, for example, the polymerization of epsilon-caprolactone initiated with a diol which contains a polymerizable pendant ethylenic group takes place primarily as follows:

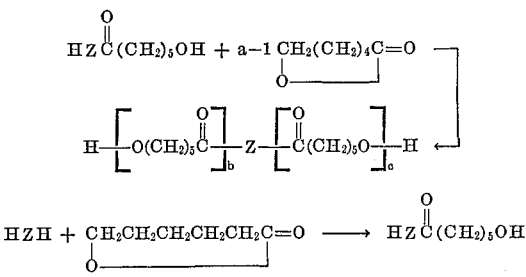

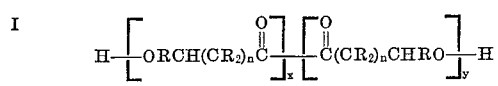

wherein Z represents the unsaturated initiator sans the hydroxylic hydrogen atom and wherein $a=b+c$.

The unsaturated polylactone diols have average molecular weights slightly greater than about 300 to as high as about 9,000, and even higher. Generally, however, the average molecular weight of these diols is from about 400 to about 9,000, preferably from 600 to about 5000. The minimum average molecular weights of the unsaturated mono- and polylactone mono-ols are slightly greater than about 150.

The unsaturated polylactones are characterized by at least two linear lactone units, i.e.,

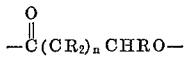

wherein $n$ is an integer having a value of 4 to 6 wherein R is hydrogen, alkyl, or alkoxy, providing, of course, that no more than three R variables are substituents other than hydrogen. When a plurality of lactones are linked together, such linkage is effected by monovalently bonding the oxy (—O—) moiety of one unit to the carbonyl

moiety of an adjacent unit. The terminal lactone unit(s) will have a terminal hydroxyl group. A class of preferred unsaturated polylactones are the dihydroxyterminated polymers containing a plurality of linear caprolactone units having the structure

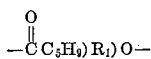

wherein $R_1$ is hydrogen or methyl and it can be attached to any linear carbon atom between the

moiety and the —O— moiety of the caprolactone unit. Another preferred class of unsaturated polylactones are those which contain one or more of the aforesaid units,

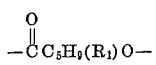

one polymerizable ethylenic band, and one hydroxyl group.

The ethylenically unsaturated polylactone diols can be represented by the following formula:

I

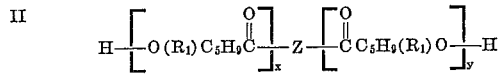

wherein R is hydrogen, alkyl, or alkoxy, no more than 3 R variables being substituents other than hydrogen; wherein $n$ is an integer having a value of 4 to 6; wherein $x$ and $y$ have a value of at least one; wherein $x+y$ has a value of at least 2 and upwards of 75 preferably from 4 to 40;

wherein Z represents a divalent organic radical which (a) contains at least one pendant polymerizable ethylenic group, (b) is free from acetylenic and benzenoid unsaturation, and (c) is composed of (i) carbon, hydrogen, and oxygen atoms, or (ii) carbon, hydrogen, oxygen, and amino nitrogen atoms; and wherein said unsaturated polylactone diol has an average molecular weight of from greater than about 300 and upwards to about 9000, preferably from about 600 to about 5000.

Preferred unsaturated polylactone diols are shown by the following formula:

II

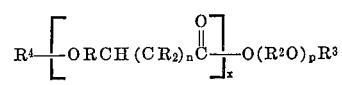

wherein $R_1$ is hydrogen or methyl or mixtures thereof; wherein $x$ and $y$ have a value of at least one; wherein $x+y$ has a value of at least 2 and upwards to 75 preferably from 4 to 40; wherein Z represents a divalent organic radical which (a) contains at least one pendant polymerizable ethylenic group, (b) is free from acetylenic and benzenoid unsaturation, and (c) is composed of (i) carbon, hydrogen, and oxygen atoms, or (ii) carbon, hydrogen, oxygen and amino nitrogen atoms; and wherein said unsaturated polylactone diol has an average molecular weight of from greater than about 300 and upwards to about 9000, preferably from about 600 to about 5000. Highly preferred diols are those in which $R_1$ is hydrogen.

It is highly preferred that Z in Formulas I and II above be derived from 1,1,1-trimethylolpropane monoallyl ether, 1,1,1-trimethylolethane monoallyl ether, 2-allyl-2-ethylpropanediol-1,3, and N,N-bis(2-hydroxyethyl)allylamine.

Another area of preferred unsaturated lactone products include those shown in Formula III below

III $$R^4 \left[ -ORCH(CR_2)_n \overset{O}{\underset{\|}{C}} \right]_x -O(R^2O)_pR^3$$

wherein R is hydrogen, alkyl, or alkoxy, no more than 3 R variables being substituents other than hydrogen; wherein $n$ is an integer having a value of 4 to 6; wherein $p$ is an integer having a value of zero to 50, preferably from zero to 20; wherein $x$ is an integer having a value of at least one and upwards to 75, preferably from 2 to 40; wherein $R^2$ is alkylene preferably having from 2 to 10 carbon atoms; wherein $R^3$ is a monovalent organic radical which (a) contains at least one pendant polymerizable ethylenic group, (b) is free from acetylenic and benzenoid unsaturation, and (c) is composed of carbon, hydrogen and/or oxygen atoms; wherein $R^4$ is hydrogen, alkenoyl or alkanoyl, both preferably having 2 to 20 carbon atoms; and wherein said unsaturated polylactone has an average molecular weight of from greater than about 150 and upwards to about 9000, preferably from about 300 to 5000.

A particular preferred subclass of the unsaturated polylactones of the Formula III above is shown below:

IV

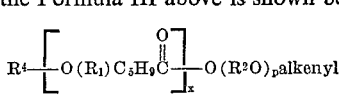

wherein $R_1$ is hydrogen or methyl or mixtures thereof; wherein the alkenyl moiety of Formula IV is preferably from 2 to 20 carbon atoms; wherein $x$ and $p$ have the values noted in Formula III supra; wherein $R^2$ is alkylene of 2 to 4 carbon atoms; wherein $R^4$ is hydrogen, alkenoyl or alkanoyl, both preferably having 2 to 20 carbon atoms. It is highly preferred that $R_1$ represent hydrogen.

The variable I in Formulas III and IV are preferably derived from unsaturated monofunctional initiators such as the alkenols, e.g., allyl alcohol, 3-buten-1-ol, 9-decen-1-ol, etc.; and the alkylene oxide adducts to such alkenols, e.g., ethylene oxide, 1,2-propylene oxide, the butylene oxidex, the decylene oxides, etc.

The unsaturated polylactone diols (Formula I supra) are extremely useful in the preparation of prepolymers and quasiprepolymers and are obtained by reacting such diols with a molar excess of organic diisocyanates as illustrated by the following equation:

V  HO—L—OH + excess Q(NCO)₂ ⟶
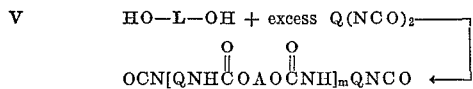

wherein HO—L—OH is an abbreviated representation of the unsaturated polylactone diols of Formula I above, and wherein Q(NCO)₂ is an abbreviated representation for an organic diisocyanate, and wherein $m$ is a number having an average value of at least one. The Q variable in Equation V is a bivalent organic radical which, of course, is inert to isocyanato groups and hydroxyl groups.

The organic diisocyanates of Equation V, Q(NCO)₂, can be any of those well documented in the literature such as m- and p-phenylene diisocyanate,
xylylene diisocyanate,
2,4- and 2,6-tolylene diisocyanate,
3,3'-dimethyl-4,4'-biphenylene diisocyanate,
3,3'-dimethoxy-4,4'-biphenylene diisocyanate,
p,p'-bibenzyl diisocyanate,
p,p'-diphenylmethane diisocyanate,
1,5-naphthalene diisocyanate,
1,6-hexamethylene diisocyanate,
1,10-decamethylene diisocyanate,
1,4-cyclohexylene diisocyanate,
4-chloro-1,3-phenylene diisocyanate,
bis(2-isocyanatoethyl) succinate,
bis(2-isocyanatoethyl) phthalate, and other such as those described in the publication by Siefken [Annalen, 562, pages 122–135 (1949)].

It will be noted from Equation V that the use of an excess of diisocyanate provides an efficient means of control over the degree of linear extension of the polyurethane molecule. If the proportions of diol and diisocyanate are chosen so that the number of reactive terminal hydroxyl groups on the diol are equal to the number of reactive isocyanate groups on the diisocyanate, relatively long, high molecular weight chains would be formed. It is desirable, for many applications, to employ amounts of diisocyanate and diol so that there is provided a ratio of greater than about one equivalent of diisocyanate per equivalent of diol, preferably from about 1.05 to about 7 equivalents, and higher, of diisocyanate per equivalent of diol, preferably still from about 1.2 to about 4 equivalents of diisocyanate per equivalent of diol, and more preferably from about 1.3 to about 2.2 equivalents of diisocyanate per equivalent of diol.

During and after preparation of the isocyanato-terminated reaction products it is oftentimes desirable to stabilize said reaction products by the addition of retarders to slow down subsequent further polymerization or less desirable side-reactions such as, for example, allophanate formation.

An extremely significant aspect of the invention is directed to the preparation of ethylenically unsaturated elastomeric polyurethanes which can be cured or cross-linked by methods employed in the natural and synthetic rubber arts. The cross-linkable polyurethanes may be conveniently prepared by several general methods. Thus, an unsaturated polylactone diol, preferably having the Formula I above, an organic diisocyanate, and a low molecular weight non-polymeric difunctional glycol, with the ratio of the diisocyanate to the sum of the polylactone diol and difunctional glycol being substantially equimolar, may be reacted together to prepare the elastomeric polyurethanes embraced with the scope of the invention. The polyacetone diol may be reacted first with a molar excess of the organic diisocyanate so as to form an isocyanate-terminated polymer (prepolymer) and this reaction may then be followed by a chain extension step with the difunctional glycol. Another method which may be employed is to first react the difunctional glycol with a molar excess of an organic diisocyanate and then react the resulting diisocyanate-terminated product with the polylactone diol. It is to be understood that in following these procedures, the polylactone diol, organic diisocyanate, and nonpolymeric difunctional glycol need not necessarily be the same in each instance in the preparation of any given elastomeric polyurethane. Since one aspect of the invention is directed to elastomeric polyurethanes having polymerizable pendant ethylenic groups, such pendant groups may be present in the difunctional glycol as well as the polylactone diol. It is apparent from the above discussion that one can employ either the prepolymer route or the "one-shot" route to prepare the elastomeric polyurethanes of the invention.

When preparing the ethylenically unsaturated elastomeric polyurethanes, it is desirable that the unsaturated polylactone diol have a molecular weight of from about 500 and upwards to about 8000, and preferably from about 700 and upwards to about 5000.

Any of a wide variety of organic diisocyanates may be employed. Such diisocyanates have been illustrated previously. In addition the organic diisocyanates may have pendant ethylenic groups.

Among the difunctional glycol chain extenders which can be employed include those which possess two hydroxyl groups such as 1,4-butanediol, 1,5-pentanediol, 1,6-hexanediol, 1,4 - bis(2 - hydroxyethoxy)benzene, diethylene glycol, ethylene glycol, dipropylene glycol, 2,2-dimethyl - 1,3 - propanediol, 1,3 - propanediol, 2-ethyl-1,3 - propanediol, 2,2 - diethyl - 1,3 - propanediol, 1,1,1-trimethylolpropane monoallyl ether, 2-allyl-2-ethylpropanediol - 1,3, N,N - bis(2 - hydroxyethyl)allylamine, 5-hexene-1,2-diol, and the like. The alkyleneoxyalkylene glycols and the alkanediols, especially the monoalkyl- and dialkyl-substituted-1,3-propanediols, 1,4-butanediol, and 1,6-hexanediol, are particularly preferred. These difunctional compounds have molecular weights below about 180.

When reacting the hydroxy compounds, i.e., the polylactone diol and difunctional glycol, with the organic diisocyanate, the reactants may be mixed together in substantially equimolar proportions, i.e., equimolar proportions of hydroxyl to isocyanate groups, in any suitable mixing equipment, at a temperature of from about 60° C. to about 135° C. until substantially all of the isocyanate groups have reacted with the hydroxyl groups. It it to be understood that the reaction will go faster at higher temperatures and the reaction can be speeded up by using a tertiary amine catalyst. It is desirable to use substantially equimolar proportions since an appreciable amount of free isocyanate groups after the reaction should be avoided as they will tend to react with the moisture in the air or react with active hydrogen atoms in the polymeric polyurethane and may cause premature gelation. It is necessary that the reaction be carried out under substantially anhydrous conditions and that the hydroxyl reactants contain less than about 0.05 percent of water. The product at this stage of the reaction is a substantially linear polymeric product in the form of a somewhat plastoelastic homogeneous solid.

In order that the elastomeric polyurethanes possess particularly desirable properties, they should be comprised of at least 60 percent by weight of the radicals obtained from the polylactone diol reactant. In the preferred polyurethanes of this invention, the polylactone-derived radicals comprise from about 60 to 95 percent of the total weight of the polyurethane product.

The proportion of the reactants should be such so as to yield elastomeric polyurethane products which possess an average of one polymerizable pendant ethylenic group for at least 7,500 units of molecular weight of product so that such product can be effectively cured. It is to be understood, however, that there may be more cross-linking sites present and that the number of cross-linking sites present in the elastomeric polyurethane product may be in excess of the number utilized in the curing step. On the average, it is preferred to have not more than about one cross-linking site per 750 units of molecular weight of product.

The cross-linkable elastomeric polyurethanes can be cured according to various procedures. A highly desirable cure can be effected by conventional vulcanization agents, e.g., sulfur, peroxides, etc., or other techniques, e.g., radiation, etc., employed in the natural and synthetic rubber arts. The term "sulfur," as used herein, is also meant to include organic sulfur-containing vulcanization agents such as, for example, the thiuram polysulfides, and the like.

In general, the quantity of vulcanization agent employed, e.g., sulfur, to effect cross-linking of the elastomeric polyurethane gum stock will be an amount sufficient to impart the desired properties to the cured product. The amount employed will, of course, be dependent, in part, upon the degree of unsaturation present in the gum stock, the molecular weight of said gum stock, the curing conditions, the vulcanization agent of choice, the incorporation of various compounding and/or modifying ingredients into the gum stock such as fillers, extenders, plasticizers, anti-oxidants, etc., and other factors. Consequently, no hard and fast rule can be set forth with regard to the concentration of the vulcanization agent. However, those familiar with the rubber art and especially the vulcanization area of the rubber art can readily determine by mere routine experimentation the desired concentration to be employed for optimum conditions and properties.

The elastomeric polyurethanes of the present invention are preferably cured by the use of a curing procedure involving the use of sulfur. In general, with this method, about 0.4 to 10 parts of sulfur per 100 parts of elastomeric polyurethane is desirable to effect the cure in the presence of appropriate accelerators. The uncured elastomeric polyurethane may be compounded with the curing agents and it is then stable and may be stored until it is desired to complete the cure, which may be accomplished by the application of heat. Curing at a temperature of about 120° to 160° C. for several minutes to several hours is generally sufficient. It is to be understood that various modifications of the sulfur cure may be employed, depending on the type of polyurethane used. Various procedures and modifications of sulfur curing are more particularly described in Encyclopedia of Chemical Technology, Kirk and Othmer, published by Interscience Encyclopedia, Inc. New York, 1953, vol. 11, pages 892–927; Principles of High-Polymer Theory and Practice, Schmidt and Marlies, published by McGraw-Hill Book Company, Inc., New York, 1948, pages 556–566; and Chemistry and Technology of Rubber, Davis and Blake, published by Reinhold Publishing Corporation, New York, 1937, vol. 74, chapter VI.

The cross-linkable elastomeric polyurethanes, as intimated above, can also be cured via other procedures such as peroxide curing. Suitable peroxides include among others, benzoyl peroxide, acetyl peroxide, dicumyl peroxide, cumene hydroperoxide, di-t-butyl peroxide, diisopropyl peroxydicarbonate, t-butyl perbenzoate, t-butyl peracetate, dibutyryl peroxide, and the like. By the term "peroxide," as used herein, is meant an organic compound which contains the structure —O—O— therein. Oftentimes, when a peroxide is used in conjunction with sulfur, the resulting novel vulcanizate frequently exhibits enhanced properties.

The properties of the cured products or vulcanizates may also be varied by suitable compounding. Thus, the use of accelerators may be desirable to increase the rate of vulcanization of the elastomeric polyurethane gum stock. Additionally, many accelerators require accelerator activators to develop the best quality in the cured gum stock. For example, zinc oxide and fatty acids like stearic acid are desirable accelerator activator systems. Further activators include among others, litharge, magnesium oxide, amines, amine soaps, and the like.

Various other modifying agents can be added to the polymeric gum stocks to improve the chemical and/or physical characteristics of the novel vulcanizates. For instance, age resistors which protect the products against deterioration attributed to atmospheric exposure such as, for example, the effect of oxygen and ozone, are preferably incorporated during the compounding step.

It may be desirable to add various oils of vegetable or mineral origin, waxes, coal tars, pitches, natural and synthetic resins, and plasticizers to the gum stock. Addition of these materials may result in several benefits in that the above materials may serve as processing aids for the uncured gum stock where they can function, for example, as plasticizers, softeners, lubricants, tackifiers, and dispersing aids. In the novel vulcanizate, they can serve as softeners, plasticizers, freezing point depressants, organic reinforcing agents, and extenders.

In many instances it will be desirable to add one or more reinforcing pigments to the novel polymeric gum stock in order to obtain a novel vulcanizate of improved strength, hardness, and resistance to abrasion or tear. Suitable reinforcing pigments include, among others, various types of carbon blacks, precipitated calcium carbonates, hard clays, hydrated silicon compounds such as calcium silicate and silicon dioxide, zinc oxide, and the like. Inert fillers and diluents may also be employed, if desired. Illustrative materials include, the soft clays, barites, talc, asbestos fiber, cellulosic material, ebonite dust, and the like.

Cured vulcanizates of varying shades of color can be obtained, if desired, by the addition of various mineral pigments and organic dyes to the polyurethane gum stock. Although titanium dioxide is probably the most preferred white pigment, white vulcanizates can also be prepared by compounding with zinc oxide, zinc sulfide, lithopone, or other mineral pigments.

In general, any one of several methods of mixing and fluxing can be utilized in the preparation of the vulcanizates. For instance, the gum stock and any other components of the desired formulation can be intimately dispersed by stirring, for example, in a Banbury mixer, or tumbling, and the admixture fluxed on a steam heated roll mill. As is well recognized in the art, the milling operation should not be effected at a temperature which will cause a breakdown or degradation, or conversely, scorch of the gum stock.

The outstanding and highly desirable physical properties of the cured vulcanizates make them particularly useful in various mechanical goods, such as, tires, electrical insulation, cable covering, footwear, gaskets, seals, packing, floor tile, adhesive formulations wherein a flexible bond is desired, and the like.

The unsaturated mono- and polylactones which contain at least one pendant polymerizable ethylenic group and a sole hydroxyl group (as illustrated in Formulas III and IV supra) can be reacted with a vinyl monomer, e.g., ethylene, vinyl acetate, etc., under typical vinyl polymerization conditions, to produce useful polyhydroxy products. Such products can be reacted with a wide host of typical polyepoxides and typical organic hardeners under conventional epoxide curing conditions to yield solid resinous products having utility in the casting, molding, and coating fields.

In addition, the monohydroxy, monoethylenically unsaturated mono- and polylactones can be reacted with a hydrosilane (one mol of lactone product per silanic hydrogen atom). In this reaction, the silanic hydrogen atom adds across the double to form siloxane-polylactone copolymeric products which have outstanding utility as surfactants in the preparation of polyurethane foams based on polycaprolactonediols, organic diisocyanate, blowing agent, and other typical ingredients in this art.

Moreover, the monohydroxy group of the lactone product can be acylated or esterified prior to forming the siloxane-polylactone product, or the siloxane-polylactone product may be formed first and the hydroxyl group thereon can be acylated or esterified in a known manner.

The acylation of the hydroxy group in Formulas III and IV supra can be effected with alkanoic acids, alkanoic acids, alkenoic acids, etc., such as acrylic acid, methacrylic acid, crotonic acid, acetic acid, propionic acid, 2-ethylhexanoic acid, and the corresponding anhydrides of alkanoic and alkenoic acids. Preferably these acids and anhydrides contain from 2 to 20 carbon atoms.

In the following examples, the procedure generally employed was as follows:

(A) PREPARATION OF SATURATED AND UNSATURATED POLYLACTONE

To a 5-liter 4-neck reaction flask equipped with thermometer, stirrer, and $N_2$ sparge tube, there were charged the lactone and initiator reactants. The resulting mixture was heated to 110° C. with heavy nitrogen sparge and this temperature was maintained until the moisture content fell to less than .04 percent. Then .044 gm. of stannous octoate (10 p.p.m.) was added and the temperature raised to 185° C. with the $N_2$ sparge now reduced to a slow trickle. The reaction was followed by the refractive index and heating was continued until a constant index was obtained (about 5–6 hours). At this time, the $N_2$ flow was again increased until the acid number fell below 0.3. When this occurs the reaction is complete and the material is transferred to dry glass bottles. The material was then analyzed for hydroxyl number, acid number, and water content.

(B) PREPARATION OF THE POLYETHYLENIC-ALLY UNSATURATED ELASTOMERIC POLYURETHANE

To a 1-liter 4-neck reaction flask fitted with a thermometer, stirrer, and addition funnel, there were charged 0.2 mole of a polylactone diol, and 0.2 mole of difunctional glycol chain extenders. These were heated to 65° C. and stirred under nitrogen purge, until the mixture was homogeneous. Then 0.4 mole of 80/20 TDI were added dropwise over a 30-minute period. The temperature was maintained at 85° C.±5° C. during this time. Stirring was continued at 85° C. for 30 additional minutes. The mixture was poured into 16 ounce polyethylene bottles and cured 4 days at 85° C. and 1 day at 100° C. Thereafter, the bottle was stripped away from the rubbery mass and the sticking temperature and reduced viscosity (0.4 gm./100 cc. in chloroform at 20° C.) were ascertained.

(C) PROCESSING OF THE POLYETHYLENICALLY UNSATURATED ELASTOMERIC POLYURETHANE

Equipment: 35 r.p.m. 6 x 12-inch mill with nip adjusted to maintain small rolling bank.

Polymer breakdown: Preheat rolls to 50° C., 75° C., or 100° C., whichever is closest to the gum stock recorded sticking temperature. Weight 100 grams of rum stock and mill to the band. If necessary, increase the roll temperature rapidly (full steam pressure) until the polymer bands well or to 160° C., whichever is lower. Remove the gum stock from the mill preferably in less than seven minutes.

Masterbatching: Adjust rolls to the samples banding temperature or 110° C., whichever is lower. Return the gum (100 gm.) to the mill. When banded (1 minute) add 30 gm. of HAF carbon black (United 60 or equivalent) as rapidly as possible. Make two ¾ cuts from each side of mill 5 minutes after banding. Record mill observations on Compounding Master Sheet.

Compounding: Add 4.0 gm. Altax after cutting. Add 1.0 gm. Captax after 1 minute, 0.80 gm. sulfur after 3 minutes and 0.35 gm. LD–395 after 4 minutes of milling. Start rolling the stock 1 minute later and pass through endwise six times. Sheet from mill and cool for 4±2 hours. Record compounding observations on Compounding Master Sheet.

Vulcanization: Charge one 6 x 6 x 0.075 inch plaque and two 1.13-inch diameter x 0.50-inch high button molds with compound stock. Cure all pieces at 150° C. for 45 minutes (2000 lb. per plaque and 500 lb. per button on press). Water cool before stripping.

Also, in the following examples, the following abbreviations have been employed:

(1) DEG represents diethylene glycol
(2) DPG represents dipropylene glycol
(3) TDG represents thiodiglycol
(4) MDEA represents N-methyldiethanolamine
(5) PDO represents 1,5-pentanediol
(6) MEPD represents 2-methyl-2-ethyl propanediol-1,3
(7) BDO represents 2-butene-1,4-diol
(8) TMP-MAE represents 1,1,1-trimethylolpropane monoallyl ether
(9) AEPDO represents 2-allyl-2-ethylpropanediol-1,3
(10) BHEAA represents N,N-bis(2-hydroxyethyl)allylamine
(11) AOPD represents 3-allyloxy-1,5-pentanediol
(12) AEPD represents 2-(allyloxyethyl)-1,3-propanediol
(13) CDM represents 3-cyclohexene-1,1-dimethanol
(14) Altax (MBTS) represents benzothiazyl disulfide
(15) Captax (MBT) represents mercaprobenzothiazole
(16) HAF or United 60 represents carbon black
(17) LD–395 represents $ZnCl_2$/MBT complex
(18) MDI represents bis(4-isocyanatophenyl)methane The hydroxyl and carboxyl numbers referred to in the Examples were obtained by the method described in Ind. Eng. Chem., Anal. Ed., vol. 17, page 394 (1945).

The physical properties of the vulcanizates were determined as follows:

(1) Shore A hardness—ASTM D676–59T
(2) Tensile strength, p.s.i.—ASTM D412–62T
(3) Elongation, percent—ASTM D412–62T
(4) Tear strength, lbs./in.—ASTM D412–54
(5) Compression set, percent—ASTM D395–61 Method B
(6) Modulus, 100 and 300%, p.s.i.—ASTM D412–61T
(7) Rebound resilience, percent—Zurck and Co., Model Z5.1E, rebound pendulum
(8) DeMattia Flex—ASTM D813

Examples 1–22

In the following examples, epsilon-caprolactone was used as the reactant. The resulting polycaprolactone diols as well as various properties thereof are shown in Table I below.

TABLE I

| Example | Initiator | OH number | Acid number | $H_2O$, percent | M.W. |
| --- | --- | --- | --- | --- | --- |
| 1 | DEG | 56.0 | 0.29 | 0.014 | 2,006 |
| 2 | DPG | 56.0 | 0.29 | 0.035 | 2,006 |
| 3 | TDG | 99.5 | 0.41 | 0.027 | 1,128 |
| 4 | MDEA | 51.0 | 0.29 | 0.021 | 2,220 |
| 5 | PDO | 109.1 | 0.24 | 0.013 | 1,024 |
| 6 | MEPD | 53.9 | 0.10 | 0.03 | 2,080 |
| 7 | BDO | 106.6 | 0.33 | 0.015 | 1,052 |
| 8 | BDO | 55.5 | 0.40 | 0.022 | 2,028 |
| 9 | TMP-MAE | 110.9 | 0.08 | 0.007 | 1,010 |
| 10 | TMP-MAE | 55.9 | 0.10 | 0.011 | 2,006 |
| 11 | TMP-MAE | 36.4 | 0.18 | 0.021 | 3,084 |
| 12 | TMP-MAE | 25.7 | 0.11 | 0.024 | 4,370 |
| 13 | AEPDO | 109.7 | 0.23 | 0.025 | 1,022 |
| 14 | AEPDO | 56.1 | 0.25 | 0.028 | 2,002 |
| 15 | BHEAA | 113.5 | 0.20 | 0.009 | 986 |
| 16 | BHEAA | 58.3 | 0.26 | 0.010 | 1,930 |
| 17 | AOPD | 109.8 | 0.09 | 0.020 | 1,020 |
| 18 | AOPD | 56.0 | 0.13 | 0.022 | 2,006 |
| 19 | AEPD | 110.8 | 0.15 | 0.036 | 1,008 |
| 20 | AEPD | 55.8 | 0.07 | 0.029 | 2,010 |
| 21 | CDM | 113.5 | 0.28 | 0.030 | 986 |
| 22 | CDM | 53.9 | 0.09 | 0.034 | 2,080 |

Examples 23–27

In the following examples, various lactones were used as the reactant. The resulting unsaturated polylactone diols as well as various properties thereof are shown in Table II below:

TABLE II

| Example | Initiator | Lactone | OH number | Acid number | H₂O, percent | Molecular weight |
|---|---|---|---|---|---|---|
| 23 | TMP-MAE | (a) | 56.2 | 0.30 | 0.021 | 1,980 |
| 24 | TMP-MAE | (b) | 56.4 | 0.20 | 0.018 | 1,970 |
| 25 | CDM | (c) | 36.0 | 0.25 | 0.031 | 3,080 |
| 26 | BHEAA | (d) | 58.0 | 0.35 | 0.027 | 1,930 |
| 27 | AEPDO | (e) | 99.0 | 0.10 | 0.019 | 1,130 | a Zeta-enantholactone.
b Eta-caprylolactone.
c Mixture of 40 percent methyl-ε-caprolactone and 60 percent ε-caprolactone.
d 50/50 mixture of methyl-ε-caprolactone and ε-caprolactone.
e 30/70 mixture of methyl-ε-caprolactone and ε-caprolactone.

Example 28

One mole of poly(ε-caprolactone) diol (initiated with 1,1,1-trimethylolpropane monoallyl ether) having an average molecular weight of approximately 1000, a hydroxyl number of 110, and an acid number less than 1.0, is reacted with two moles of 80/20 mixture of 2,4- and 2,6-tolylene diisocyanate at 85–100° C. The resulting mixture is maintained thereat for a period of one to two hours. There is obtained an isocyanato-terminated polyurethane product having a free NCO content of approximately 6.2 percent.

Example 29

Two moles of poly(ε-caprolactone) diol (initiated with 1,1,1-trimethylolpropane monoallyl either) having an average molecular weight of approximately 2000, a hydroxyl number of 56, and an acid number less than 0.5 is reacted with three moles of p,p'-diphenylmethane diisocyanate at 120–140° C. The resulting admixture is maintained thereat for a period of one hour. There is obtained an isocyanate-terminated polyurethane product having a free NCO content of approximately 1.8 percent.

Example 30

One mole of poly(40 methyl-ε-caprolactone/60-ε-caprolactone) diol (initiated with 3-cyclohexene-1,1-dimethanol) having an average molecular weight of approximately 3080, a hydroxyl number of about 36, and an acid number less than 0.5, is reacted with 2.1 moles of a 80/20 mixture of 2,4- and 2,6-tolylene diisocyanate at 90–100° C. The resulting admixture is maintained thereat for a period of two-three hours. There is obtained an isocyanato-terminated polyurethane product having a free NCO content of approximately 2.6 percent.

Example 31

Two moles of poly(50 methyl-ε-caprolactone/50-ε-caprolactone) diol (initiated with N,N-bis(2-hydroxyethyl)-allylamine) having an average molecular weight of approximately 1930, a hydroxyl number of 58, and an acid number less than 1.5, is reacted with four moles of 80/20 mixture of 2,4- and 2,6-tolylene diisocyanate at 85–110° C. The resulting admixture is maintained thereat for a period of one to two hours. There is obtained an isocyanato-terminated polyurethane product having a free NCO content of approximately 3.7 percent.

Example 32

One mole of poly(ε-caprolactone) diol (initiated with 2-(allyloxyethyl)-1,3-propanediol) having an average molecular weight of approximately 1000, a hydroxyl number of 112, and an acid number less than 1.0, is reacted with two moles of 1,5-naphthalene diisocyanate at 85–95° C. The resulting admixture is maintained thereat for a period of three hours. There is obtained an isocyanato-terminated polyurethane product having a free NCO content of approximately 5.9 percent.

Example 33

Three moles of poly(ε-caprolactone) diol (initiated with 2-allyl-2-ethylpropanediol-1,3) having an average molecular weight of approximately 1020, a hydroxyl number of about 110, and an acid number less than 1.0, is reacted with four moles of 2,4-tolylene diisocyanate at 85–100° C. The resulting admixture is maintained thereat for a period of about 3 hours. There is obtained an isocyanato-terminated polyurethane product having a free NCO content of approximately 2.2 percent.

Example 34

Two moles of poly(ε-caprolactone) diol (initiated with 2-allyl-2-ethylpropanediol-1,3) having an average molecular weight of approximately 2000, a hydroxyl number of about 56, and an acid number less than 1.0, is reacted with 4.4 moles of p,p'-diphenylmethane diisocyanate at 85–110° C. The resulting admixture is maintained thereat for a period of one to two hours. There is obtained an isocyanato-terminated polyurethane product having a free NCO content of approximately 4.0 percent.

Example 35

Three moles of poly(ε-caprolactone) diol (initiated with 3-cyclohexene-1,1-dimethanol) having an average molecular weight of approximately 990, a hydroxyl number of about 114, and an acid number less than 1.0, is reacted with four moles of 1,5-naphthalene diisocyanate at 85–100° C. The resulting admixture is maintained thereat for a period of one to two hours. There is obtained an isocyanate-terminated polyurethane product having a free NCO content of approximately 2.2 percent.

Example 36

One mole of poly(30 methyl-ε-caprolactone/70-ε-caprolactone)diol (initiated with 2-(allyloxyethyl)-1,3-propanediol)having an average molecular weight of approximately 1130, a hydroxyl number of about 99, and an acid number less than 1.0, is reacted with 3.2 moles of 3,3'-dimethyl-4,4'-biphenyl diisocyanate at 95–100° C. The resulting admixture is maintained thereat for a period of one hour. There is obtained an isocyanato-terminated polyurethane product having a free NCO content of approximately 9.2 percent.

Example 37

Two moles of poly(ε-caprolactone) diol (initiated with 1,1,1 - trimethylolpropane monoallyl ether) having an average molecular weight of approximately 1250, a hydroxyl number of about 99, and an acid number less than 1.0, is reacted with four moles of a 80/20 mixture of 2,4- and 2,6 - tolylene diisocyanate at 100° C. The resulting admixture is maintained thereat for a period of one hour. There is obtained an isocyanato-terminated polyurethane product having a free NCO content of approximately 5.3 percent.

Example 38

Three moles of poly(ε-caprolactone) diol (initiated with N,N - bis(2 - hydroxyethyl)allylamine) having an average molecular weight of approximately 986, a hydroxyl number of 113, and an acid number less than 1.0, is reacted with four moles of 3,3' - dimethyl - 4,4'-biphenylene diisocyanate at 85° C. The resulting admixture is maintained thereat for a period of four hours. There is obtained an isocyanato-terminated polyurethane product having a free NCO content of approximately 2.1 percent.

Example 39

Two moles of poly($\epsilon$-caprolactone) diol (initated with 2 - (3 - butenyl) - 1,2 - ethanediol) having an average molecular weight of approximately 1250, a hydroxyl number of about 91, and an acid number less than 1.0, is reacted with four moles of 1,5 - naphthalene diisocyanate at 85° C. The resulting admixture is maintained thereat for a period of four hours. There is obtained an isocyanato-terminated polyurethane product having a free NCO content of approximately 5.0 percent.

Example 40

Two moles of poly($\epsilon$-caprolactone) diol (initiated with 3 - allyloxy - 1,5 - pentanediol) having an average molecular weight of approximately 1010, a hydroxyl number of about 110, and an acid number less than 1.0, is reacted with four moles of a 80/20 mixture of 2,4- and 2,6-tolylene diisocyanate at 85–100° C. The resulting admixture is maintained thereat for a period of one to two hours. There is obtained an isocyanato-terminated polyurethane product having a free NCO content of approximately 6.2 percent.

Example 41

A mixture of 200.8 grams of polycaprolactone diol (M.W. 1004) initiated with diethylene glycol, 17.42 grams of 2 - allyloxymethyl 2 - ethyl - 1,3 - propanediol, 0.12 gram of allyl alcohol, and 53.12 grams of 80/20 2,4-2,6-toluene diisocyanate were charged to a flask, then heated at 90° C. under a nitrogen atmosphere for one hour. Thereafter, the reaction product was transferred to a polyethylene bottle, purged with nitrogen before sealing, and heated in an 80° C. air circulating oven for 3 days (72 hours). The polyethylenically unsaturated gum stock was then compounded. The recipe, curing conditions, and physicals are shown below:

| Recipe (parts by weight): | | |
|---|---|---|
| Gum stock | 20.0 | 20.0 |
| United 60 (HAF) | 6.0 | 6.0 |
| Altax | 0.8 | 0.8 |
| Captax | 0.2 | 0.2 |
| LD 395 | 0.07 | 0.07 |
| Sulfur | 0.15 | 0.15 |
| Curing conditions: | | |
| Pressure | 1,000 | 1,000 |
| Temperature, ° C | 140 | 152.8 |
| Time, minutes | 60 | 45 |
| Tensile strength, p.s.i | 4,740 | 4,625 |
| Elongation, percent | 438 | 410 |
| Hardness, Shore A | 73 | 74 |
| Modulus, p.s.i. at: | | |
| 100% | 470 | 445 |
| 300% | 1,800 | 1,705 |
| Percent work recovery | 41.5 | 47.8 |

Examples 42–46

The polycaprolactone diol-based gum stocks were prepared in accordance with the procedure discussed prior to the example section. Adiprene C and Elastothane 455 are commercial products. All gum stocks were vulcanized in the manner indicated previously. The resulting physical properties are shown in Table III below.

Examples 47–49

The vulcanizates prepared in Example 42 (polyether-based), Example 43 (polyadipate-based), and Example 44 (polycaprolactone-based) were subjected to various recognized environmental tests and their performances are noted below:

| | Polyether [1] | Polyadipate [2] | Polycaprolactone [3] |
|---|---|---|---|
| Oil resistance, 70 hours at 212° C.: | | | |
| Percent swell in: | | | |
| ASTM #1 oil | 2 | 0 | 0 |
| ASTM #3 oil | 29 | 5 | 13 |
| Reference Fuel B | 45 | 16 | 29 |
| Brittle point, ° C | 105 | 58 | 105 |
| Hydrolysis resistance, years, quarter life in water at 25° C | 0.5 | 0.3 | 1.1 |

[1] Gum stock of Example 42.
[2] Gum stock of Example 43.
[3] Gum stock of Example 44.

The above results show that the polycaprolactone-based vulcanizate combines, to a significant degree, the desirable properties and characteristics of vulcanizates based on both the commercially acceptable polyether and polyadipate gum stocks.

Example 50

A polyethylenically unsaturated gum stock is prepared from a mixture of polycaprolactone diol initiated with diethylene glycol (M.W. 1000), MDI, and 2-butene-1,4-diol. The vulcanization is effected as indicated prior to the examples. The results were as follows:

| | |
|---|---|
| Shore A hardness | 83 |
| Tensile strength, p.s.i. | 4400 |
| Elongation, percent | 375 |
| Modulus, p.s.i.: | |
| At 100% | 1075 |
| At 300% | 4000 |
| Tear strength, lbs./in. | 376 |
| Rebound, percent | 13 |
| Compression set | 80 |

The compression set value indicates that the gum stock did not cure tightly. Consequently, the resulting vulcanizate is unsatisfactory for commercial applications.

Example 51

The gum stock employed in this example was prepared by reacting equimolar quantities of polycaprolactone diol initiated with TMP–MAE (M.W. 1000) and TDI. The vulcanized elastomer exhibited the following properties:

| | |
|---|---|
| Hardness, Shore A | 61 |
| Tensile strength, p.s.i. | 3500 |
| Elongation, percent | 610 |
| 100% modulus, p.s.i. | 270 |
| 300% modulus, p.s.i. | 1090 |
| Tear strength, die C, p.l.i. | 270 |
| Rebound, Zwick | 36 |
| Compression set, percent | 31 |

Example 52

(A) Allyl diglycol, $CH_2{=}CHCH_2O(C_2H_4O)_2H$ (1 mole) and epsilon-caprolactone (8 moles) were placed in a flask equipped with a nitrogen sparging tube. The mix-

TABLE III

| Example | Shore A hardness | Tensile strength, p.s.i. | Elongation, percent | Modulus p.s.i. at— 100% | Modulus p.s.i. at— 300% | Tear strength, lbs./in. | Rebound, percent | Comp. set, percent | NBS abrasion index | DeMattia flex |
|---|---|---|---|---|---|---|---|---|---|---|
| 42 [a] | 71 | 3,950 | 325 | 700 | 3,650 | 275 | 46 | 30 | 625 (575) | 150 |
| 43 [b] | 68 | 4,525 | 550 | 420 | 1,880 | 234 | 45 | 30 | 175 | |
| 44 [c] | 64 | 4,000 | 475 | 410 | 2,225 | 233 | 47 | 17 | 275 | 5,000 |
| 45 [d] | 76 | 4,275 | 575 | 680 | 2,125 | 350 | | 31 | 325 (575) | 75,000 |
| 46 [e] | 72 | 3,925 | 450 | 480 | 2,275 | 212 | 47 | 20 | 250 | 10,000 |

[a] Adiprene C, Poly(tetramethyleneoxy) glycol (M.W. 800–1,200), TDI, and allyl 2,3-dihydroxypropyl ether.
[b] Elastothane 455, Poly(ethylene/propylene adipate) glycol, TDI, and allyl 2,3-dihydroxypropyl ether.
[c] Polycaprolactone diol initiated with TMP–MAE (M.W. 2,000), TDI, and TMP–MAE.
[d] Polycaprolactone diol initiated with diethylene glycol, (M.W. 2,000), TDI, and TMP–MAE.
[e] Polycaprolactone diol initiated with TMP–MAE (M.W. 2,000) MDI, and TMP–MAE.

ture was heated to 92° C. and sparged for 2 hours to remove any water present. Stannous octoate was then added, the sparge was removed, and the temperature raised to 192° C. under a nitrogen blanket. After heating for 5 hours, the reaction was allowed to cool. There was obtained a polycaprolactone product having terminal ethylenic unsaturation (CH$_2$=CH—), a sole primary hydroxyl group, an average molecular weight of approximately 1050, a hydroxyl number of approximately 55, and an acid number of less than 1.0.

(B) In like manner as above, when one mole of allyl alcohol is employed in lieu of the allyl diglycol starter, there is obtained a polycaprolactone product having terminal unsaturation (CH$_2$=CH—), a sole primary hydroxyl group, an average molecular weight of approximately 975, a hydroxyl number of about 58, and an acid number of less than 1.0.

It can be seen from the preceding examples that another aspect of the invention is also directed to polyethylenically unsaturated polyurethane elastomers (vulcanizable gum stocks) which are prepared by reacting a saturated polylactone diol such as the dihydroxy "lactone polyesters" described in U.S. Pat. No. 3,169,945, an organic diisocyanate, and an ethylenically unsaturated glycol chain extender. Such extenders may be the same as the unsaturated initiators discussed generically and specifically above. These vulcanizable gum stocks may be prepared via the prepolymer or one-shot routes, and they may be cured or vulcanized as discussed throughout the specification. The operative conditions for the preparation of the gum stocks and vulcanizates have been set out previously in detail.

What is claimed is:

1. An ethylenically unsaturated polylactone diol having the formula:

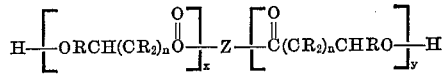

wherein R is of the group consisting of hydrogen, alkyl, and alkoxy, said alkyl and said alkoxy having up to 12 carbon atoms, and no more than R variables being substituents other than hydrogen; wherein $n$ is an integer having a value of 4 to 6; wherein $x$ and $y$ have a value of at least one; wherein $x+y$ has a value of at least 2 and upwards to 75; wherein Z represents a divalent organic aliphatic radical which is linked to each carbonyl moiety in the above formula through an oxy group and which (a) contains at least one pendant polymerizable ethylenic group, (b) is free from acetylenic and benzenoid unsaturation, and (c) is composed of (i) carbon, hydrogen, and oxygen atoms, or (ii) carbon, hydrogen, oxygen, and amino nitrogen atoms, said oxygen atoms being of the group consisting of the aliphatic etheric oxygen, aliphatic hydroxylic oxygen, and mixtures thereof; and wherein said unsaturated polylactone diol has an average molecular weight of from greater than about 300 and upwards to about 9000.

2. The ethylenically unsaturated polylactone diol of claim 1 having the formula:

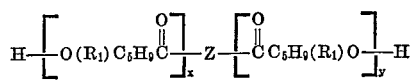

wherein R$_1$ is hydrogen or methyl or mixtures thereof; wherein $x$ and $y$ have a value of at least one; wherein $x+y$ has a value of at least 2 and upwards to 75; wherein Z represents a divalent organic aliphatic radical which is linked to each carbonyl moiety in the above formula through an oxy group and which (a) contains at least one pendant polymerizable ethylenic group, (b) is free from acetylenic and benzenoid unsaturation, and (c) is composed of (i) carbon, hydrogen, and oxygen atoms, or (ii) carbon, hydrogen, oxygen, and amino nitrogen atoms, said oxygen atoms being of the group consisting of aliphatic etheric oxygen, aliphatic hydroxylic oxygen, and mixtures thereof; and wherein said unsaturated polylactone diol has an average molecular weight of from greater than about 300 and upwards to about 9000.

3. The ethylenically unsaturated polylactone diol of claim 2 having the formula:

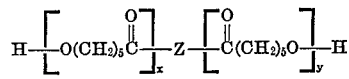

wherein $x$ and $y$ have a value of at least one; wherein $x+y$ has a value of at least 4 and upwards to 40; wherein Z represents a divalent organic aliphatic radical which is linked to each carbonyl moiety in the above formula through an oxy group and which (a) contains at least one pendant polymerizable ethylenic group, (b) is free from acetylenic and benzenoid unsaturation, and (c) is composed of (i) carbon, hydrogen, and oxygen atoms, or (ii) carbon, hydrogen, oxygen, and amino nitrogen atoms, said oxygen atoms being of the group consisting of aliphatic etheric oxygen, aliphatic hydroxylic oxygen, and mixtures thereof; and wherein said unsaturated polylactone diol has an average molecular weight of from greater than about 600 and upwards to about 5000.

4. The ethylenically unsaturated polylactone diol of claim 2 wherein the variable Z represents:

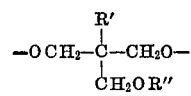

wherein R' is hydrogen or alkyl of 1 to 20 carbon atoms, and wherein R" is alkenyl of 2 to 20 carbon atoms.

5. The ethylenically unsaturated polylactone diol of claim 2 wherein the variable Z represents:

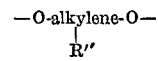

wherein R" is alkenyl of 2 to 20 carbon atoms and wherein the alkylene moiety contains from 2 to 20 carbon atoms.

6. The ethylenically unsaturated polylactone diol of claim 2 wherein the variable Z represents:

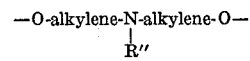

wherein R" is alkenyl of 2 to 20 carbon atoms and wherein the alkylene moiety contains from 2 to 20 carbon atoms.

7. The ethylenically unsaturated polylactone diol of claim 3 wherein the variable Z represents:

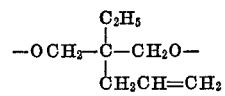

8. The ethylenically unsaturated polylactone diol of claim 3 wherein the variable Z represents:

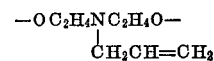

9. The ethylenically unsaturated polylactone diol of claim 3 wherein the variable Z represents:
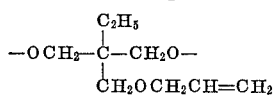
10. The ethylenically unsaturated polylactone diol of claim 3 wherein the variable Z represents:
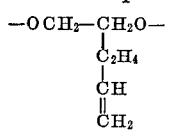
References Cited
UNITED STATES PATENTS
| | | | |
|---|---|---|---|
| 2,366,738 | 1/1945 | Loder et al. | 260—484 O |
| 2,559,510 | 7/1951 | Mikeska et al. | 260—484 A |
| 2,712,025 | 6/1955 | Rehberg et al. | 260—484 A |
LORRAINE A. WEINBERGER, Primary Examiner
P. J. KILLOS, Assistant Examiner
U.S. Cl. X.R.
260—77.5, 468 C, 471 C, 482 B, 615 B, 635 R